Feb. 4, 1964  C. H. KEARNY  3,120,167
SHELTER VENTILATION SYSTEM
Filed March 19, 1962  4 Sheets-Sheet 2
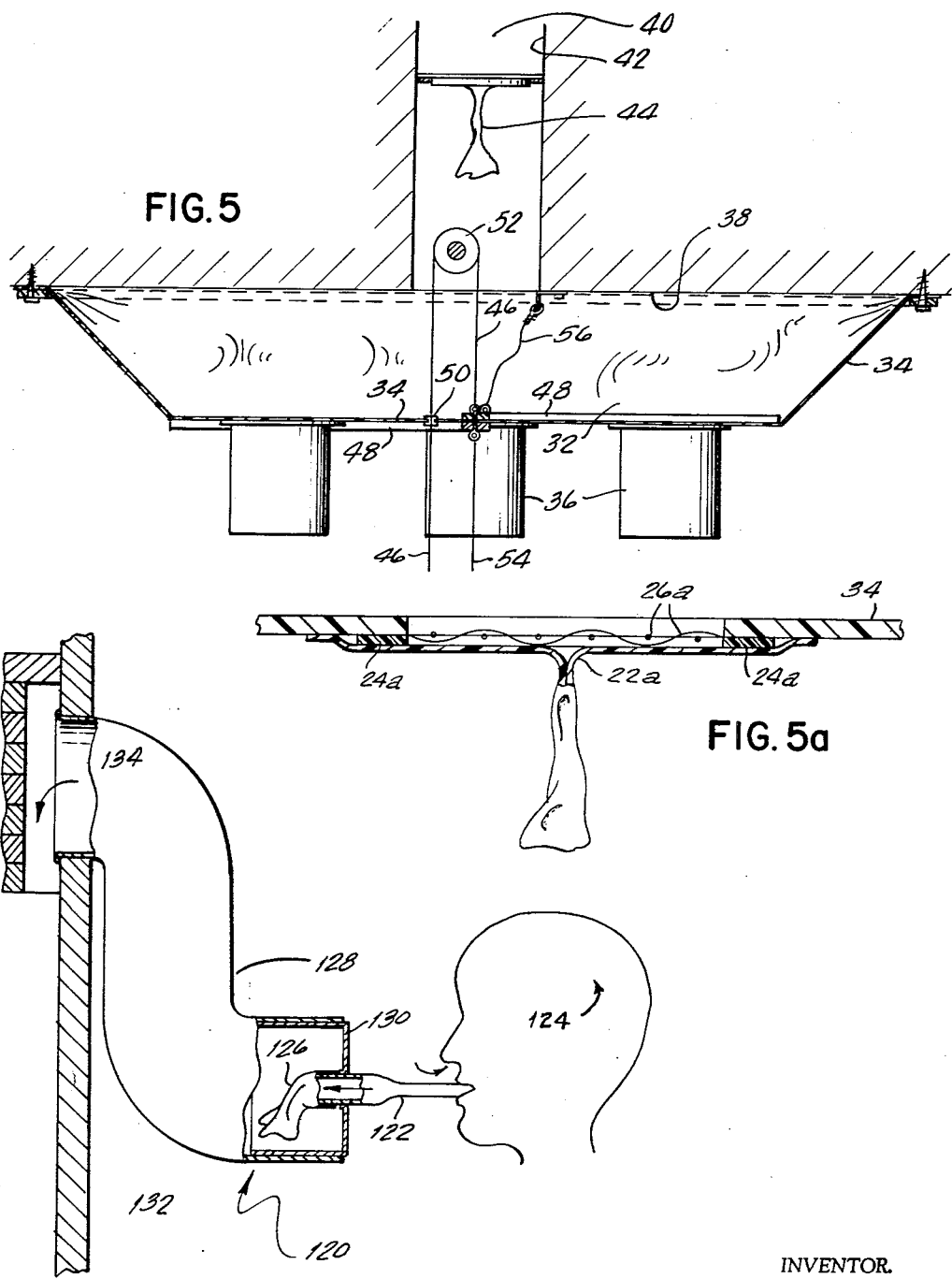
INVENTOR.
CRESSON H. KEARNY
BY
Harry Ernest Rubens
ATT'Y Feb. 4, 1964    C. H. KEARNY    3,120,167
SHELTER VENTILATION SYSTEM
Filed March 19, 1962    4 Sheets-Sheet 3

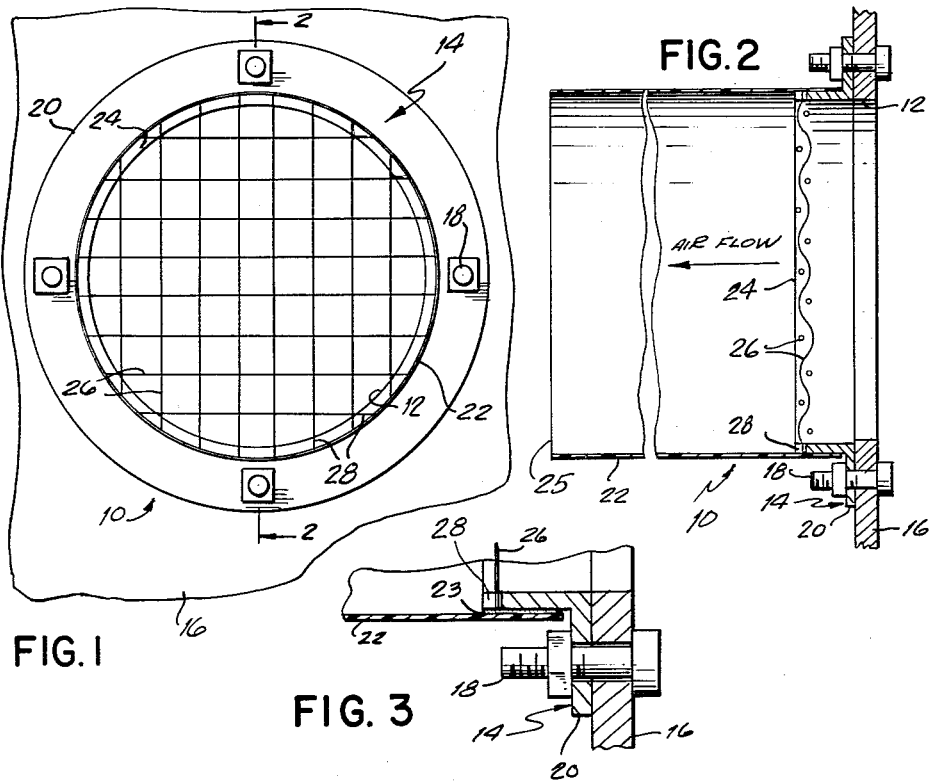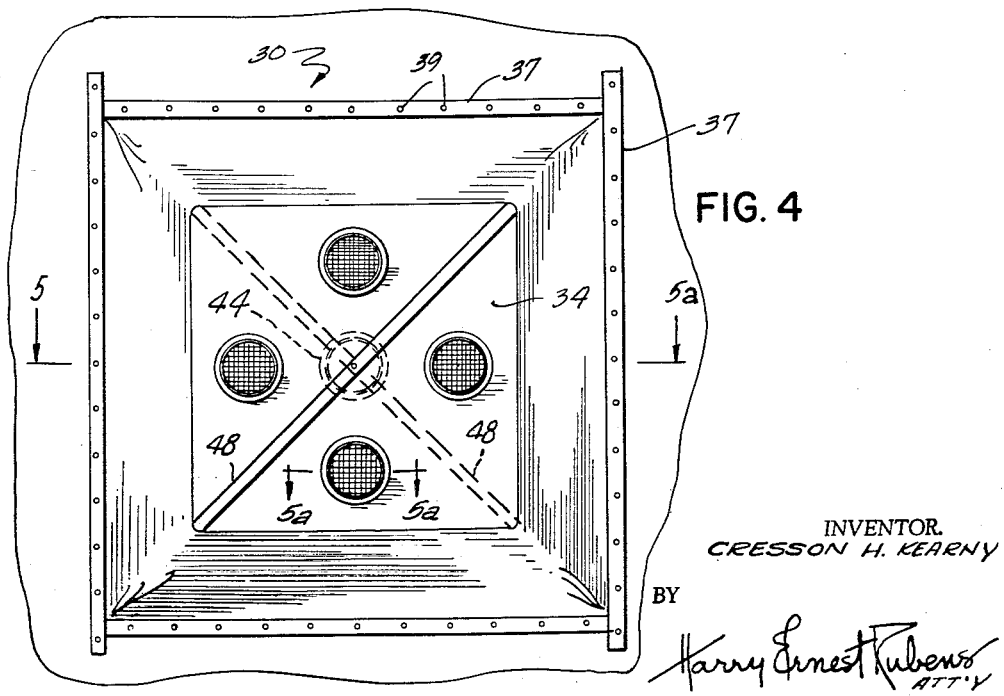

INVENTOR.
CRESSON H. KEARNY
BY
Harry Ernest Rubens
ATTORNEY

Feb. 4, 1964 C. H. KEARNY 3,120,167
SHELTER VENTILATION SYSTEM
Filed March 19, 1962 4 Sheets-Sheet 4

INVENTOR.
CRESSON H. KEARNY
BY
Harry Ernest Rubens
ATTORNEY

United States Patent Office 3,120,167
Patented Feb. 4, 1964

3,120,167
SHELTER VENTILATION SYSTEM
Cresson H. Kearny, Montrose, Colo.
(% Hudson Institute, P.O. Box 551, White Plains, N.Y.)
Filed Mar. 19, 1962, Ser. No. 180,657
8 Claims. (Cl. 98—39)

The present invention relates to a specific system, comprising component devices and methods for ventilating closed rooms or shelters.

The Federal and various State governments are presently advocating that our citizens be provided with the means of shielding themselves from fall-out radiation. Adequate fall-out shelters, usually built underground, are contemplated which will, among other requirements, have to be provided with air pumps and related equipment that will: (1) Provide the occupants of shelters with enough fresh air to give them sufficient oxygen at least to maintain life, (2) Keep the carbon dioxide concentrations in the air in the shelter low enough so as not to endanger the occupants, (3) Supply air in large enough volumes so that, in the absence of other means for keeping the bodies of the shelter occupants at normal temperatures, this additional volume of ventilating air will perform this body-cooling function essential for the maintenance of life, and (4) When required, have sufficient air suction or pumping power to draw into the room or shelter the ventilating air through filters or other energy-consuming devices designed to remove injurious fall-out particles and/or other harmful substances from the air.

However, to date most fall-out shelters have been made, and are continuing to be made, with air pumps and related devices that fail to constitute a system capable of satisfying the four requirements enumerated above. Furthermore, the inadequacy of the air pumps or blowers presently most often used to provide forced ventilation for most shelters is pointed up by the fact that most current widely circulated civil defense literature implies that for adequate ventilation 5 cubic feet per minute (c.f.m.), or even 3 c.f.m., per person is sufficient (see for example "The Family Fall-out Shelter," OCDM MP–15), whereas for a typical underground shelter continuously occupied for days during hot, humid weather, as a matter of fact 15 c.f.m. per person, or even more, of ventilating air is required to keep shelter occupants cool enough to survive. See Engineering Research Memorandum "Control of Shelter Environment" OCDM–EN–60–2–RM. The present pumps commonly used are of too small capacities and are of designs too inefficient, both in terms of their mechanical efficiencies, and of their metabolic energy costs when manually operated, to furnish these very large volumes of ventilating air required to cool shelter occupants under adverse temperature and humidity conditions. Also the present air pumps and blowers that are commonly used in shelters are costly, averaging around $75.00 retail for the usual home-shelter models. If much cheaper air pumps are made available, the resulting savings if millions of shelters are built will be of national importance. And it would be advantageous if shelter ventilating pumps did not have to be placed on a wall, where they occupy valuable floor space. An additional disadvantage of the present shelter blowers and pumps is that they require special molds or dies to manufacture; if air pumps were available that could be made out of a variety of common materials in thousands of simple shops, without requiring complicated, hard-to-get tools, then our possible national needs for very large numbers of adequate shelter ventilating pumps could be met, even in a few weeks in the midst of an acute need. Furthermore, if such adequate, simple, inexpensive air pumps are made available, then not only poor people but poor nations would be helped toward securing adequate shelter protection for themselves. And, especially in the case of larger ventilating pumps for larger fall-out and blast shelters, there is a need for air pumps that can be efficiently operated manually, in case of failure of the motor or power operating the air pump.

Accordingly, a primary object of my invention is to provide ventilating means, whether small pumps, or large motor-driven models for group shelters, that can be readily and efficiently operated manually in case the power or the motor fails.

A further object is to provide very simple ventilating pumps that can be operated manually by shelter occupants, to force air, in large or small volumes, out of a shelter or to draw it in, and thereby causing fresh air to flow through the shelter.

Another object is to provide a means for using the shelter occupants' lung power to remove from the shelter room the carbon dioxide and other impurities produced in the breathing process.

A further object of the present invention is to provide a system of ventilating fall-out and/or blast shelters by providing the occupants, even if the main components of this system are unavailable, with devices for using their own lungs while breathing to force their exhaled breaths out of the shelter through thin collapsible tubes thus decreasing the amount of air in the shelter room, and thereby lowering its pressure; this lowered pressure causes fresh air to be forced into the room through the intake openings provided, by the higher atmospheric pressure outside the shelter.

Another object is to provide air pumps large enough in capacity to furnish the large volumes of air necessary to keep the bodies of shelter occupants from reaching harmfully high temperatures under frequently occuring circumstances in hot and/or humid weather.

Another object is to provide shelter ventilating pumps having higher mechanical efficiencies than characterize the air blowers at present most frequently used for shelter ventilation, and having lower metabolic energy costs when manually operated.

A further object is to provide pumps that because of their high mechanical efficiencies and low metabolic energy costs will enable shelter occupants, even when manually operating these pumps, to force adequate volumes of air through even a filter offering considerable resistance to the passage of air.

Another object is to provide improved air check valves to increase the efficiencies of air pumps, these valves being characterized by their very large apertures, to permit very low air pressure differentials to open and to close them efficiently, and by the very small energy losses that air experiences when moving through these valves when they are open.

Another object is to provide shelter ventilating pumps of such simple designs, and capable of being constructed in thousands of simple shops out of such a variety of common materials, that in a crisis literally millions of such pumps could be manufactured within a few weeks.

Another object is to make pumps that are not only simpler than the presently used shelter ventilating devices, but are much easier to repair.

Another object is to provide such ventilating pumps of adequate capacity at lower costs than the costs of the presently commonly used and often inadequate pumps.

Another object is to provide a design which will lower the costs of adequate shelter ventilating pumps so much that anyone can be aided in providing adequate fall-out protection.

Other and further objects of the invention will be hereinafter disclosed or will be obvious upon an understanding of the embodiments about to be described, shown in the accompanying drawings, and indicated in the appended claims.

In accordance with one exemplification of the present invention, the objects of my system of shelter ventilation are accomplished by providing a shelter and its occupants with simple tubes containing improved check valves that enable the occupants to exhale air from their lungs into this system of tubes and check valves thus carrying the exhaled air out of the shelter, along with the toxic carbon dioxide and other impurities contained in this exhaled air, and thereby simultaneously eliminating the increase in the carbon dioxide content of the air of the shelter, and thus reducing the amount of fresh ventilating air that must be supplied to maintain health and/or life. I also may provide by my system of shelter ventilation less expensive, simple, advantageously placed air pumps of suction types for drawing fresh air into the shelter more efficiently and in large enough volumes even to provide for the cooling of shelter occupants in hot, humid weather, either through a filter or without a filter; and new and improved air check valves that operate efficiently at very low pressure differentials, and that when open, offer very little resistance to the movement of large volumes of air at high rates of flow. I also provide very simple shelter air exhaust pumps formed of a variety of available flexible materials and enabling shelter occupants manually to pump large volumes of air out of a shelter room, thereby lowering the pressure in the shelter and causing fresh air to be forced into the shelter by outside atmospheric pressure.

The various embodiments of my shelter ventilating system are shown in the accompanying drawings, forming a part of the specification, wherein:

FIG. 1 shows a plan view of an embodiment of a curtain-and-screen valve.

FIG. 2 shows a side elevation of the same mounted to a supporting structure.

FIG. 3 shows a cross-section of a fragment through the base of the valve.

FIG. 4 shows a bottom plan view of one embodiment of my air suction pump suspended from the ceiling.

FIG. 5 shows a longitudinal cross-sectional view of the embodiment taken in the plane 5—5 of FIG. 4.

FIG. 5a shows a sectional view of a single curtain-and-screen valve taken through 5a—5a of FIG. 4, but with the curtain in closed position.

FIG. 9 illustrates a schematic arrangement of tubes and check valve for individual use of shelter occupants.

Figure 6:
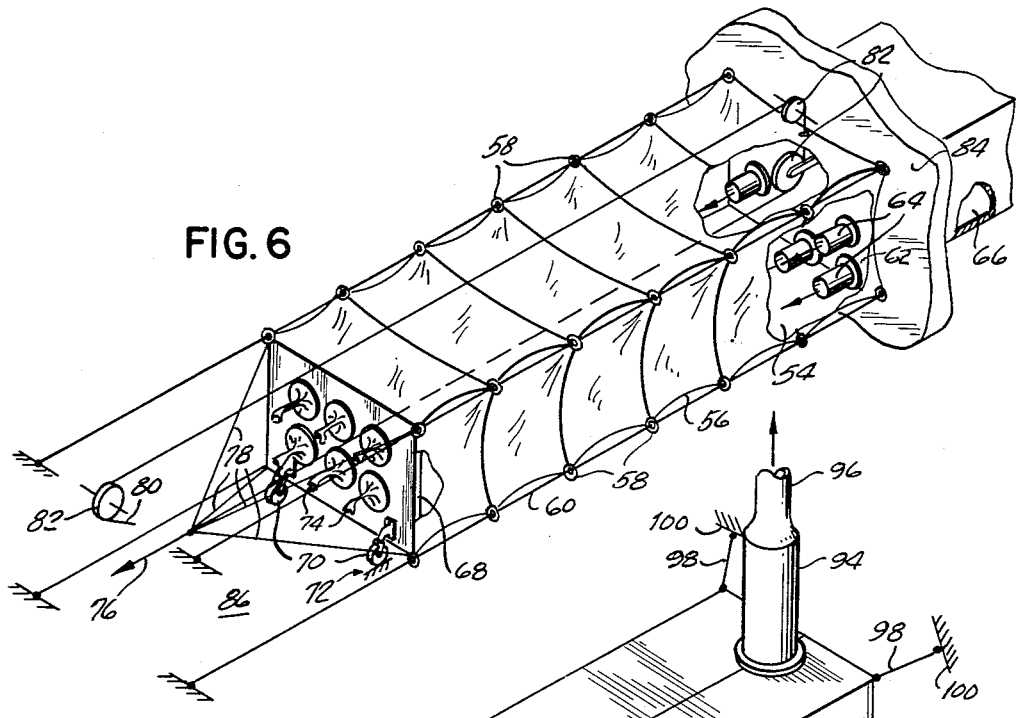
FIG. 6 shows a perspective view of a further modification.

Referring to the drawings in detail, there is shown in FIGS. 1, 2, and 3 a curtain-and-screen valve 10 having a valve aperture 12 in the valve frame 14 shown in the form of a shape-retaining ring. The complete curtain-and-screen valve 10 is mounted in its desired position on the supporting structure 16 by devices including the bolts 18 extending through the base 20 of the frame. One end of the curtain 22 of very thin, flexible material, such as polyethylene film is connected in the form of an airtight tube to the leg 24 of the frame. The other end of this tube 25 is left open, and the length of the tube is preferably greater than the diameter of the valve aperture. A curtain that has proved to be efficient for my purpose is a polyethylene film of around 0.5 mil in thickness.

Stretched across the valve aperture is a wide mesh screen 26 which may be made of woven strong, thin filaments such as nylon thread or wire threaded through the slots 28 in leg 24. A coarse mesh screen of ¼" to ½" is usually employed, to minimize air friction. The screen 26 serves to keep the curtain 22 always on the same side of the valve aperture, no matter in what direction the air or other fluid is passing through the valve aperture 12.

When the movement of the air is through the valve aperture 12, in the direction of the side of the valve aperture on which the curtain 22 is attached, then even a very slight force from the moving air exerted on the light flexible curtain opens it fully to its open-ended tubular shape shown in FIG. 2, and the air can move through the valve aperture easily, with very little more resistance to its flow than would be offered by an open hole having the same diameter as the valve aperture. By providing a valve with a large aperture, a given volume of air need be accelerated to much lower velocities than is necessary to force this same volume of air in the same time, to pass through the small aperture of a commonly used valve such as a flap valve in an air pump, or of the housing around the impellers of a blower. Thus much lower velocity air passing through a typical wide-aperture curtain-and-screen valve means that the input of energy (that can be expressed by the kinetic energy, $\frac{1}{2} mv^2$, of the accelerated air) required to both open a curtain-and-screen valve and to force air through it, is efficiently small. But as soon as the direction of air flow is reversed, then the first small volume of air moving in the reversed direction through the valve aperture causes the flexible tubular curtain 22 to collapse on itself and against screen 26, at once shutting off the main flow of air (as is shown in FIG. 5a). The closing action of this valve is completed by the air pressure in the small spaces between inner surfaces of the flexible curtain being reduced in the characteristic manner governing the flow of gases and fluids, i.e., an increased velocity is accompanied by reduced pressure. Therefore, since the pressure of the moving air inside the largely collapsed tubular curtain is reduced, the air pressure on outside surfaces of the tubular curtain squeezes the flexible impermeable material of the curtain together, thus shutting off these relatively minor flows of air. Thus, a curtain-and-screen valve can be shut efficiently by very small pressure differentials, and does not depend on carefully machined or otherwise nicely formed valve seats or closing surfaces for its efficiency in shutting off an air flow.

The curtain 22 is glued as at 23 or otherwise suitably secured to the leg 24 of the frame 14.

It can be seen that the orientation of such a curtain-and-screen valve, relative to the direction of gravity, has practically no effect on its efficiency of operation.

In FIGS. 4 and 5 is shown a flexible diaphragm suction pump 30. A cross-section of the pump is illustrated in FIG. 5, during the exhaust half of its cycle. This pump's chamber 32 comprises a flexible moving diaphragm 34 in which are one or more exhaust valves 36 that open when the pressure inside the pump chamber is greater than the pressure in the room, and a rigid side 38, to which the diaphagm 34 may be mounted by strips of wood 37 secured in an airtight manner by nails 39 forming a part of a shelter room ceiling. In the opening 40 of the air intake duct 42, is a screen-and-curtain intake valve 44 shown open in FIG. 4 and FIG. 5 and of the type shown in FIG. 2. When the movable flexible diaphragm 34 is pulled up by the pulley cord 46 connected to the stiffening sticks 48 fixed on each side of the flexible movable diaphragm 34, then the decrease in volume of the pump chamber results in increased air pressure in the pump chamber 32. This increased pressure results in the air exhaust valves 36 opening, as shown, and the air intake valve 44 closing, as shown, allowing the pump chamber to be exhausted of the fresh outside air which was previously drawn down the intake duct 42.

Pulley cord 46 runs through a snug hole 50 in diaphragm 34 into the pump chamber 32, and over a fixed pulley 52 and thence downward to the end of this cord, which is attached to the movable diaphragm 34 around its stiffening sticks 48. Thus, pulling downward on pulley cord 46 results in raising the movable diaphragm 34. This causes the air pressure in the pump chamber to increase, resulting in air intake valve 44 being closed, and exhaust valves 36 being opened, causing the air in the pump chamber to be expelled into the shelter room.

To expand the chamber, the rope 54 is pulled until checked by the check cord 56, connecting the rigid wall 38 to the diaphragm 34. This will close check valves 36 and open intake valve 44, allowing fresh air to be again drawn into chamber 32.

In FIG. 5a, the screen 26a is attached directly to the flexible membrane 34 forming the supporting wall structure by heat-sealing thermal plastics, gluing, or taping 24a, and the flexible curtain 22a may be similarly attached directly to the flexible supporting wall structure or to the taping 24a, or to the edge of the screen itself.

It can thus be seen that an efficient curtain-and-screen valve can be made for a fraction of the cost of commonly used check valves designed to let through and shut off equally large volume of air.

It should be noted that the movable pump diaphragm 34 can be returned to its evacuated, exhausted position by other means besides the chamber exhaust pulley cord 46 shown. These substitute means include springs or elastic bands within the pump chamber 32 to pull up the movable diaphragm, or counter-weights that are lifted by part of the power put into pulling down rope 54.

Various means, both manual and mechanical, can be used to operate this type of flexible membrane pump. When a larger version of this pump, suitable for ventilating a group shelter, is operated while attached above the heads of shelter occupants, one of the better ways to operate it manually is to have a swing seat attached to the pull rope 54 so that the seat is at the same height as a standing person's crotch. Thus a person can draw air into the pump chamber by merely sitting down on the seat, and remaining seated until the pump chamber is full of fresh air. Then the operator lifts himself once more to a standing position, partly by pulling downward with his arms on exhaust cord 46 and thus expelling the fresh air from the pump chamber into the shelter room.

A pump having an outer perimeter of 5½ ft. x 5½ ft. and a depth of stroke of 1½ ft., can be operated thus by one man at the rate of 8 strokes per minute, operating against a total pressure differential of 1000 millinches, and can pump 300 cubic feet per minute. If the flexible movable diaphragm 34 is made of a very strong flexible film such as Mylar, it need not be more than 4 or 5 mils thick.

Another embodiment of this flexible membrane type of pump is shown by FIG. 6. Here the pump chamber 54 comprises a long, flexible "box" with a rectangular cross section. The four long sides 56 of the pump chamber may be made of practically impermeable material such as nylon duck, plastic film or coated fabric. The four edges of these long sides are affixed to numerous rings 58 which slide on four fixed taut guide wires 60. Thus the wires guide and largely support the movable sides of the flexible pump chamber. The intake part of the pump chamber consists of an impermeable panel 62 made of plywood, for example, containing a number of curtain-and-screen valves 64 set to function as intake valves for fresh air coming from the air intake duct 66. The movable end panel 68 of this pump chamber is not only guided and partly supported by connected sliding rings 58 running on the taut guide wires 60, but also its weight is largely borne by two wheels 70 connected to the lower corners of movable end panel 68 and rolling on the floor 72. Set in movable panel 68 are a number of curtain-and-screen exhaust valves 74. The movable panel 68 is moved forward during the suction half of the pump cycle by being pulled by suction cord 76 and its bridle 78 causing resulting differences in air pressures to open the intake valves 64 and close exhaust valves 74 and to make fresh air flow into the pump chamber 54 from the intake duct 66.

When the pump chamber has been filled with fresh air, pulling the end of the pulley line 80 toward the movable panel will expel the air into the shelter room. This is due to the arrangement of pulley line 80 operating over three pulleys 82. This causes movable panel 68 to be pulled toward the end wall 84 when the pump chamber is emptied and exhausted of air. During this resultant exhaust half of the pump cycle intake valves 64 are closed, and through the opened exhaust valves 74 fresh air flows into the shelter room 86.

A pump of this type, operated by one man, and with no filter involved, having a size of 5½ ft. x 2½ ft. x 15 ft., will pump in excess of 1000 cubic feet per minute.

Other embodiments of this type of flexible membrane suction pump can be made employing a helical spring inside a cylindrical flexible membrane to guide and hold open the flexible membrane pump chamber especially during the suction half of the pump cycle, or by using a return spring for moving the diaphragm in one direction.

Figure 7:
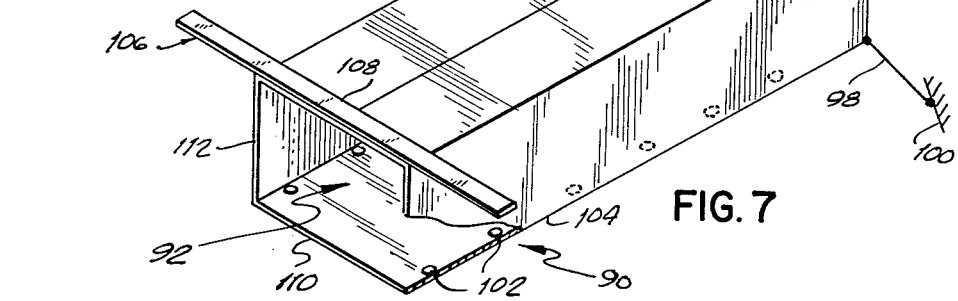
FIG. 7 is a perspective view of still another modification.

In FIG. 7 is shown an exhaust shelter ventilating bag pump 90, that is operated by a person in a shelter room to force air out of the room, and thus to cause fresh air to be drawn into the room to replace the air that has been forced out. This bag pump, the illustrated model which is rectangular in cross section, has only one open end 92. The five sides of this bag pump are made of polyethylene film, but can be made of a wide variety of flexible material including other plastic films, coated fabrics, canvas, etc. Near the opposite closed end of the bag is fixed a flexible exhaust duct 94 of similar light material, that either can itself carry air, that is squeezed from the bag pump's chamber, out of the room, or flexible exhaust duct 94 can be connected to a rigid air exhaust pipe 96. An exhaust valve can be placed in the exhaust duct but is not essential. To reduce the danger of tearing the bag, it can advantageously be suspended on elastic members 98 (such as linked rubber bands), that are in turn connected to a convenient wall 100 of the shelter. Several small weights 102 are connected to the sides of the bag along their lower edges 104. An elongated handle 106 is attached to the whole length of the top edge 108 of the open end 92 of the bag. To make the bag pump open more rapidly to its full size, the pump operator lifts the open end of the pump by means of the elongated handle 106 and at the same time pulls the elongated handle away from the bag pump's fixed end. This lifting and pulling on elongated handle 106 can advantageously be combined with a gentle oscillatory up-and-down swinging of the bag, in keeping with its natural period of oscillation, in order to fill the bag with air as quickly and as efficiently as possible.

Figure 8:
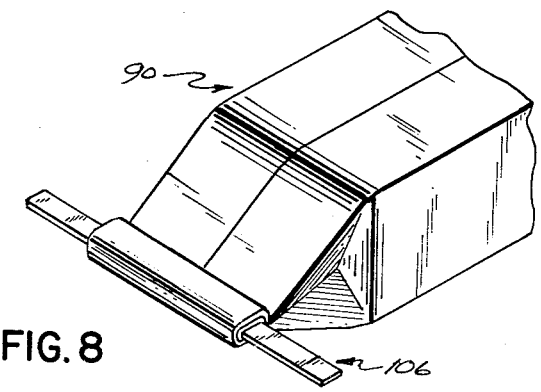
FIG. 8 is a fragmentary perspective view showing the rolled-up end of the modification illustrated in FIG. 7.

Once the bag is full of air, the operator gathers up the lower open edge 110 of the open end of the bag, and folds it over elongated handle 106, as is shown in FIG. 8. Therefore the open ends of the bag are rolled onto the elongated handle thus sealing the air in the bag except for its path of escape out of exhaust duct 94. The operator then continues to expel air from the bag both by pressing against the bag with his body and elongated handle 106, and also by continuing to roll the flexible bag onto the elongated handle. The edges and seams are preferably reinforced with a tape 112 or by other suitable means.

When most of the air has thus been expelled from the bag pump and thus from the room, the operator unrolls the bag pump from the elongated handle, at the same time walking back with the elongated handle so as once again to extend the bag, fill it with more air from the shelter, and be ready to start a new pump cycle.

Using a bag pump having dimensions of 2½ ft. x 3½ ft. x 9 ft., one man can expel 100–150 cubic feet per minute from a shelter.

FIG. 9 illustrates a schematic arrangement of tubes and check valves comprising a lung pump 120, that consists of a mouth tube 122 such as a piece of garden hose or similar substantial tube, held in the mouth of a shelter occupant 124 with a check valve 126 connected to this mouth tube so that the shelter occupant can exhale air from his mouth into this mouth tube, but cannot draw air through this tube back into his mouth. The pump also consists of a tube 128 connected to mouth tube 122 by shape-retaining cup 130; the sizes of these parts are exaggerated in the illustration for increased clarity of detail. Tube 128 leads the shelter occupant's exhaled breath out of the shelter room 132 into the exhaust vent 134. A number of occupants, each provided with a mouth tube and a valve, each connected by separate tubes to the same main tube, such as 128 may thus use their own lungs to bring sufficient air for their breathing requirements into a single shelter.

Note that the check valve 126 shown is a curtain valve, that can be made to function with the end of the tube itself serving as a single-mesh "screen" to keep the cylindrical "curtain" from being reversed and thereby reopened after closing properly, by air pressure differences operating in the direction that closes this check valve. It takes considerable force of air pressure to turn inside out and thus reverse an elongated, open-ended, very flexible tube that is fixed at one of its open ends.

If the open end of such a cylindrical or tubular "curtain," is fastened by a tape to a side of the shape retaining cup 130, it will keep the curtain from being reversed and re-opened after being initially closed by a change in the direction of air flow. Moreover, the curtain will open up fully when air moves in the normal valve-opening direction. These methods eliminate the need of the usually desirable "screen," and are especially useful in tubes of small diameters for individual use.

To operate this lung pump apparatus 120, shelter occupants 124, merely, while holding mouth tubes 122 in their mouths, inhale through their noses and exhale through their mouths into the mouth tubes Once past the check valves 126 the exhaled breaths are led out of the shelter room through the flexible tubes 128, that can be made of thin polyethylene film or similar material. The shape-retaining cup 130, being larger in diameter than the curtain supporting tube 122, allows the curtain to collapse upon itself and against the end of the tube 122 when the direction of air flow attempts to reverse.

Thus, shelter occupants are enabled to use their own lung power to force their exhaled breaths out of the shelter room. This resulting lowered air pressure in the room causes fresh air from outside to be forced into the room through an intake duct or other opening, that can be arranged so that most fall-out dust settles out of this air or is filtered out by being sucked in through fabric such as a blanket, by outside higher atmospheric air pressure. At the same time the amount of fresh air the shelter occupants need to satisfy their breathing requirements (that under cold conditions may be all the air they need) is forced into the shelter by higher outside atmospheric pressure. The amount of breathing air needed when shelter occupants are in effect exhaling outside the shelter they are occupying is reduced, since the air in the shelter remains uncontaminated by exhaled carbon dioxide and water vapor from shelter occupants' lungs.

If the majority of the occupants of a shelter are thus using their lungs as shelter ventilating pumps, a lesser number of persons in the shelter (as small children) can get enough fresh air for their breathing (but not necessarily cooling) requirements even if they are only breathing normally in the shelter room, and not serving as lung pumps.

Figure 10:
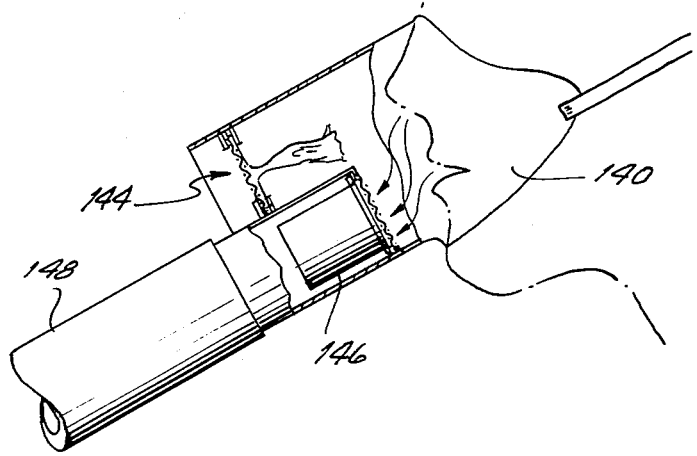
FIG. 10 illustrates a side view of a mask with curtain-and-screen valves.

FIG. 10 shows a different version of part of this lung pump system, with a breathing mask 140, to be worn over the mouth and nose of a shelter occupant 142. The mask will replace the mouth tube and check valve which are required to be held in his mouth as in FIG. 9. He will thus be enabled to use his lungs as a shelter pump to bring in fresh air, while inhaling and exhaling through his mouth, and even while asleep. When inhaling, fresh air is drawn into his lungs through intake check valve 144 and on exhaling, only curtain valve 146 is left open, so that his exhaled breath is forced into tube 148, and thence by this and similar tubes conducted out of the shelter room.

Figure 11:
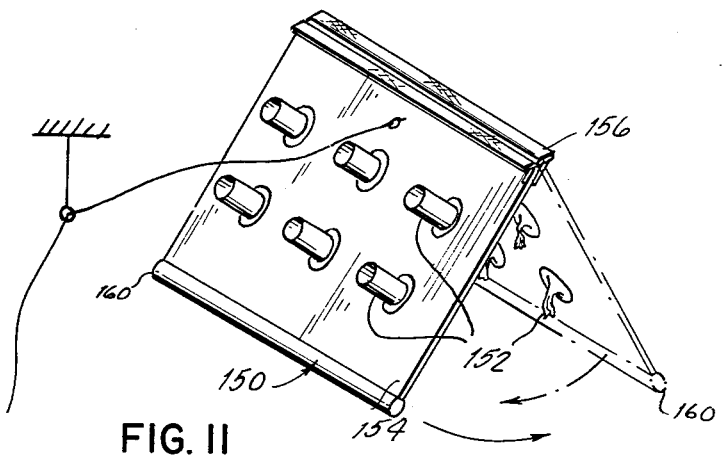
FIG. 11 shows a perspective view of a directional punkah employing check valves.

FIG. 11 shows a vertical elevation through a directional punkah 150, an air circulating device with its surface consisting mostly of some kind of low-pressure-differential check valves 152 (here shown for clarity as just a few curtain-and-screen valves) mounted in the panel 154, so that when the punkah swings as shown, to the right, on the cloth hinge 156, then its valves all open and push very little air to the right. However, when the punkah is pulled by the cord 158 in the opposite direction, all of its valves will close, with the result that much more air is forced to the left. The weight 160 gives the punkah a pendulum effect. In this manner such a directional punkah can serve to circulate air within a shelter space much more efficiently than the provenly beneficial cooling and air-moving punkahs of India and Burma.

The dot-dash lines indicate the punkah at the start of the movement with the valves in closed position.

From the foregoing description it will be seen that the instant ventilation system provides for various contingencies that may arise, and make is possible for shelter occupants to provide for themselves by several different devices. Sufficient ventilating air, depending on requirements, is produced to give the occupants enough fresh air to breathe, or, at the other extreme, to ventilate their shelter economically with the large volume of air required to keep their bodies from becoming dangerously overheated during prolonged periods of confinement in a shelter during hot, humid weather.

While manually operated devices are shown, it will be undersood that they can be converted by conventional means, to electrical operation, where desired.

Various changes may be made in the form, construction and arrangement of the parts of the ventilating devices described herein, without departing from the spirit and scope of the invention and without sacrificing its advantages. It is to be understood that all mattter herein is to be interpreted as illustrative and not in any sense limiting this system of shelter ventilation and its component devices to the particular embodiments described and shown herein.

I claim:

1. In an apparatus for controlling the flow of a fluid in one direction, comprising a shape retaining base member having an aperture, a screen mounted to the base member and extending across the aperture a tubular flexible impermeable curtain open at both ends, one end of said curtain being mounted in a leak proof connection about the aperture with the other end of the curtain extending in the direction that it is desired to move the fluid whereby the fluid may be moved through the curtain in one direction, and when the fluid movement is reversed, the curtain will collapse upon the screen to seal the aperture.

2. In an apparatus for controlling the flow of fluid in one direction, comprising a shape retaining base member having an aperture, a screen mounted to said base member and extending across said aperture, and a flexible impermeable curtain open at both ends, one end of said curtain being mounted with a leak proof connection about said screen and around said aperture with the other end of the curtain extending in the direction that it is desired to move the fluid whereby the fluid may be moved through the curtain in one direction and when the fluid movement is reversed, the curtain will collapse upon the screen to seal the aperture.

3. An apparatus for control of the directional flow of fluids, comprising a flexible walled pump having a pump chamber, one of its end walls being fixed in position and with movable walls of the pump chamber being made of an impermeable flexible material, a check valve in one of said walls for allowing the flow of the fluid in one direction through said valve, said flexible walls being movable to alternately reduce the volume of the chamber and to expand the volume of the chamber to cause the flow of the fluid through the check valve, said check valve consisting of a shape retaining base having an aperture, a tubular curtain made of thin and very flexible impermeable material mounted in a fluid tight manner to said base around said aperture, a screen mounted to said base member and extending across the aperture, said curtain having an unattached open end extending in the direction in which the fluids are intended to move through said valve.

4. The apparatus of claim 3 in which the fixed wall is the ceiling of a room.

5. The apparatus of claim 3 in which the fixed wall is the side wall of a room.

6. The apparatus of claim 3 provided with a shape retaining chamber wall opposite the end that is fixed, and provided with a check valve for allowing the flow of fluids through the valve in the shape retaining wall, in the same direction as the first check valve.

7. The apparatus of claim 6 in which the shape retaining wall is provided with ropes and pulleys for causing the pump to contract and expand.

8. An apparatus for controlling the flow of air comprising a hinged panel, means for causing the panel to move in a pendulum motion, a check valve in said hinged panel for allowing the air to move through the panel in one direction of the pendulum-like panel movement, and for checking said flow of air through the check valve of the panel when movement is in the reverse direction, said check valve comprising a tubular curtain, a shape-retaining base member having an aperture, and a screen mounted to said base member and extending across the aperture, said tubular curtain consisting of an impermeable material, sufficiently thin to permit collapse upon the screen, and open at both ends, one end of said curtain being mounted in a leak-proof connection about the aperture with the other end of the curtain extending in the direction that it is desired to move the air.

References Cited in the file of this patent

UNITED STATES PATENTS

| | | |
|---|---|---|
| 1,007,719 | McNeal | Nov. 7, 1911 |
| 1,787,153 | Huffman | Dec. 30, 1930 |
| 2,174,960 | Barzen | Oct. 3, 1939 |
| 2,181,175 | Cohen | Nov. 28, 1939 |
| 2,247,654 | Ferguson | July 1, 1941 |
| 2,423,890 | Hurt | July 15, 1947 |
| 2,833,229 | Donegan | May 6, 1958 |